United States Patent [19]

Sugino et al.

[11] Patent Number: 4,867,263
[45] Date of Patent: Sep. 19, 1989

[54] APPARATUS FOR SUPPORTING A VIBRATING OBJECT

[75] Inventors: Masaru Sugino, Fujisawa; Shinichi Matsui, Yokosuka, both of Japan

[73] Assignee: Nissan Motor Company, Limited, Yokohama, Japan

[21] Appl. No.: 931,135

[22] Filed: Nov. 17, 1986

[30] Foreign Application Priority Data

Nov. 28, 1985 [JP] Japan .................... 60-268986

[51] Int. Cl.$^4$ .................................................. B60G 15/04
[52] U.S. Cl. ........................... 180/291; 267/140.1; 267/219; 180/312
[58] Field of Search ................. 180/291, 312; 267/140.1, 219

[56] References Cited

U.S. PATENT DOCUMENTS

| 4,449,603 | 5/1984 | Langweider et al. ............ 180/291 |
| 4,648,576 | 3/1987 | Matsui ............................ 267/140.1 |
| 4,664,219 | 5/1987 | Hoerig ............................ 180/291 |
| 4,700,933 | 10/1987 | Chikamori et al. .............. 267/140.1 |
| 4,709,779 | 12/1987 | Takehara ......................... 267/140.1 |
| 4,763,884 | 8/1988 | Matsui et al. ................... 267/140.1 |
| 4,790,521 | 12/1988 | Ide et al. ........................ 267/219 |

FOREIGN PATENT DOCUMENTS

| 3340153 | 8/1984 | Fed. Rep. of Germany . |
| 57-142633 | 9/1982 | Japan . |
| 59-122447 | 8/1984 | Japan . |

Primary Examiner—Richard A. Bertsch
Attorney, Agent, or Firm—Foley & Lardner, Schwartz, Jeffery, Schwaab, Mack, Blumenthal & Evans

[57] ABSTRACT

An apparatus for supporting a vibration body such as a power unit of an automotive vehicle in which an orifice in a partitioning member for communicating two fluid chambers whose cross sectional area is varied to change a resonant frequency of the apparatus so that a plurality of vibrations can effectively be reduced with effective uses of a vibration prevention function provided by the reduction of a dynamic spring constant of a fluid dynamic damper and of a damping function provided by a fluid dynamic damper action.

22 Claims, 3 Drawing Sheets

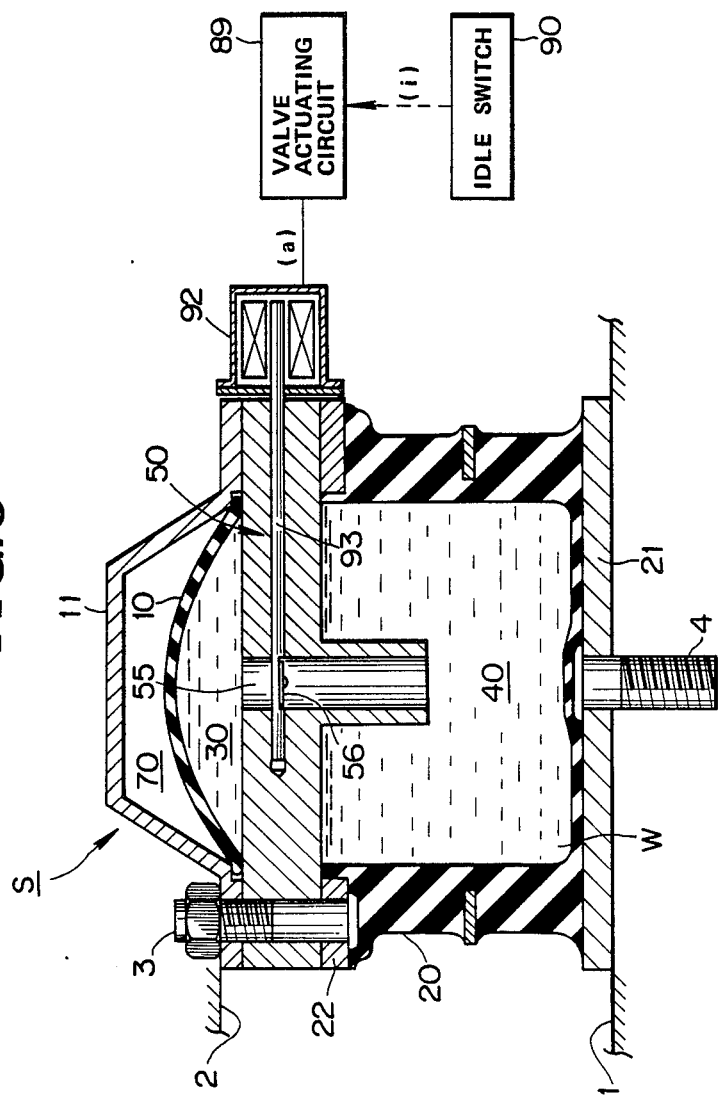

APPARATUS FOR SUPPORTING A VIBRATING OBJECT

BACKGROUND OF THE INVENTION

1. Field of the Invention

The present invention relates to an apparatus for supporting a vibrating object applicable to an apparatus for supporting a power unit (e.g., engine) of an automotive vehicle which effectively reduces various vibrations mainly caused by the power unit.

2. Description of the Prior Art

Conventional apparatus for supporting vibrating objects such as power units of automotive vehicles are exemplified by a Japanese Utility Model Application Unexamined Open No. Sho 57-142633 published on Sept. 7, 1982.

In the above-identified Japanese Utility Model Application, a liquid chamber formed of a cylindrically shaped elastic body is partitioned into a first and second liquid chambers through a partitioning wall. The partitioning wall has an orifice through which the first and second chambers are communicated and which is provided with an orifice valve for opening and closing the orifice. In addition, the orifice valve is connected electrically to a valve changeover apparatus so that an amount of flow through the orifice can be controlled.

However, there is a drawback in the conventional apparatus exemplified by the above-identified document.

That is to say, when the orifice valve is open, vibrations transmitted from the vibrating object are mainly absorbed in the elastic body constituting the liquid chambers. On the other hand, when the orifice valve is close, the vibrations are mainly damped by means of a flow resistance caused when liquid flows through the orifice which is not close.

Since, in the exemplified conventional apparatus, a dynamic damping effect of fluid has not completely been recognized, one of a plurality of vibrations having a particular frequency is accidentally reduced but no others of a plurality of vibrations having particular frequencies can effectively be reduced due to the set state of the apparatus.

A performance demanded for most effectively utilizing the apparatus for supporting the vibrating object of such a fluid sealing type will be described below before explaining the present invention.

The apparatus for supporting the vibrating object is required to have two functions simultaneously a vibration prevention function for preventing a transmission of minute vibrations caused by the vibrating object provided by the reduction of a dynamic spring constant of a fluid dynamic damper and a vibration damping function for damping large vibrations mainly caused by the vibrating object provided by an action of the fluid dynamic damper. The vibration prevention function required for the vibrating object supporting apparatus is achieved by a flow of an internal sealed fluid in the fluid chambers through the orifice along a vibration input direction so that the dynamic spring constant is reduced. The damping function also required for the apparatus is achieved by the fluid dynamic damper constituted by a fluid within the orifice as a fluid mass and elasticity caused by the flow of the sealed fluid between the chambers as a fluid spring. Therefore, it is most effective for the apparatus to use both, so called, vibration prevention and vibration damping functions.

In a case where the liquid chamber is partitioned into two chambers and the orifice provides means for communicating both chambers, the fluid dynamic damper is formed on the basis of a fluid within the orifice and a resonant frequency F of the fluid dynamic damper is expressed as follows:

$$F = \frac{1}{2\pi} \sqrt{\frac{K}{M}}$$

wherein K denotes the fluid dynamic spring constant and M denotes an equivalent mass of a fluid within the orifice.

The resonant frequency F can thus be varied as the change in the fluid spring constant K or the change in the equivalent mass of the fluid within the orifice M. It is noted that the fluid equivalent mass M is determined by a real mass of fluid within the orifice and a relationship of cross sectional areas of the two fluid chambers to the cross sectional area of the orifice.

Hence, to reduce the plurality of vibrations by means of the fluid-sealed type vibrating object supporting apparatus, it is an essential performance required for the apparatus to enable the resonant frequency to be set at a different frequency through the change in the resonant frequency F and, in addition, to provide a fluidity for the fluid passing through the orifice having a predetermined fluid flow cross sectional area in order to exhibit a high vibration prevention function.

SUMMARY OF THE INVENTION

With the above-described drawback in mind, it is an object to provide an apparatus for supporting a vibrating object which effectively reduces a transmission of various types of vibrations mainly caused by the vibrating object.

It is another object of the present invention to provide an apparatus for supporting a vibrating object whose resonant frequency is variable.

It is still another object of the present invention to provide an apparatus for supporting a vibrating object which simultaneously provides the vibration prevention and vibration damping functions.

It is yet still another object of the present invention to provide an apparatus for supporting a vibrating object which is most effectively applicable to a power unit supporting apparatus for a vehicle.

These objects can be achieved by providing an apparatus comprising: (a) first means for forming a fluid dynamic damper so as to damp a particular frequency vibration in a vibrating object; and (b) second means for reducing a fluid dynamic constant of the fluid dynamic damper so as to prevent a transmission of another particular frequency vibration in the vibrating object.

These objects can be achieved by providing an apparatus comprising: (a) first means for supporting a vibrating object, the first means having a resonant frequency; (b) second means for detecting an operating condition of the vibrating object and (c) third means for varying the resonant frequency of the first means according to the detected operating condition so that the transmission of a plurality of vibrations in the vibrating object can be suppressed.

These objects can be achieved by providing an apparatus for supporting a vibrating object, comprising: (a) a first fluid chamber located on the vibrating object and having at least one elastic wall thereof; (b) a second fluid chamber located on another object and having at least one elastic wall thereof; (c) a partitioning member disposed between the first and second fluid chambers; and (d) an orifice penetrated through the partitioning member for communicating the first and second fluid chambers, a cross sectional area of which is variable.

BRIEF DESCRIPTION OF THE DRAWINGS

FIG. 5 is a cross sectional view of a second preferred embodiment in the vibrating object supporting apparatus according to the present invention;

DETAILED DESCRIPTION OF THE PREFERRED EMBODIMENTS

Reference will hereinafter be made to the drawings in order to facilitate understanding of the present invention.

The essential performance requirements for a fluid-sealed type vibrating object supporting apparatus have been described.

Figure 1:
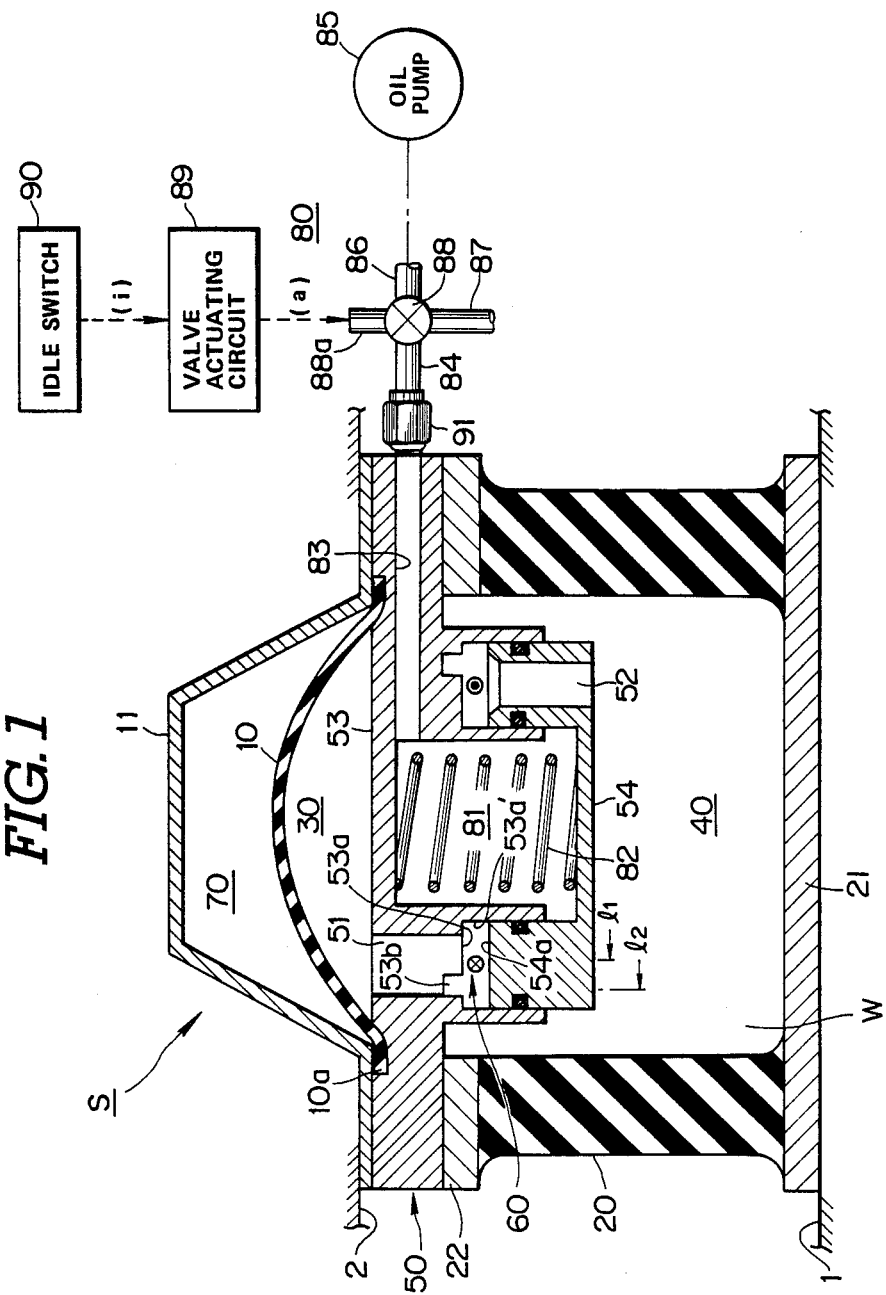
FIG. 1 is a cross sectional view of a first preferred embodiment in a vibrating object supporting apparatus according to the present invention.

FIG. 1 shows a first preferred embodiment according to the present invention which is applicable to an apparatus for supporting a power unit (constituting the vibrating object) of an automotive vehicle.

The power unit supporting apparatus S is intervened between a vehicle body 1 and power unit 2. The apparatus S comprises: a first elastic wall 10; a second elastic wall 20; a first fluid chamber 30; a second fluid chamber 40; a partitioning member 50; a circular orifice (cross-sectional area variable orifice) 60; sealed fluid W; an air chamber 70; and an actuator 80.

The first elastic wall 10 is installed with its outer peripheral part 10a sealed to an upper part of the above-described partitioning member 50. The first elastic wall 10 is formed in a diaphragm shape using a thin rubber material.

The outer peripheral part 10a of the first elastic wall 10 is sealed in a tightly grasped state by means of the partitioning member 50 and elastic wall cover 11. The first fluid chamber 30 is defined by an inner space enclosed with the first elastic wall 10 and partitioning member 50. The air chamber 70 is defined by an inner space enclosed with the first elastic wall 10 and elastic wall cover 11.

The second elastic wall 20 is installed between the vehicle body 1 and power unit 2. The second elastic wall 20 is formed cylindrically of a thick rubber material. A flat plate 21 is adhered to one side of the second elastic wall 20 opposing the vehicle body 1 and a ring plate 22 is also adhered to the other side thereof opposing the partitioning member 50 after vulcanizations for both sides of the second elastic wall 20. The ring plate 22 is installed in a tight sealed state to the partitioning member 50. The second fluid chamber 40 is defined by an inner space enclosed with the second elastic wall 20, partitioning member 50, and plate 21 fixed to the vehicle body 1.

The partitioning member 50 is disposed between the first fluid chamber 30 and second fluid chamber 40. The partitioning member 50 is constituted by a first communication passage 51, a cylinder part 53 having a second communication passage 52, and a vertical direction movable assembly member comprising a piston part 54.

In the first embodiment, the cylinder part 53 is fixed and the piston part 54 is movable. A ring-shaped orifice 60 having a substantially semicircumferential portion is formed between an inner wall 53a of the cylinder part 53 and end surface 54a of the piston part 54 by the combination of the cylinder and piston parts 53, 54.

In addition, a ring groove 53b having a larger diameter $l_2$ than a diameter $l_1$ of the above-described ring-shaped orifice 60 is formed on the inner wall 53a of the cylinder part 53. When the piston part end surface 54a is positioned so as to contact with an end surface 53a' of the cylinder part 53, the ring-shaped orifice 60 is formed with the ring groove 53b and end surface 54a of the piston part 54.

A sealed fluid W is sealed in the first fluid chamber 30, second fluid chamber 40, first communication passage 51, second communication passage 52, and ring-shaped orifice 60 and has an incompressibility such as non-freezing liquid. An actuator 80 provides means for actuating the piston part 54 to displace in the vertical direction as viewed from FIG. 1 so that a cross sectional area of the ring-shaped orifice 60 formed between both cylinder and piston parts 53, 54 is changed. The actuator 80 in the first preferred embodiment is provided with a pressure chamber 81, spring 82, operating oil pressure passage 83, operating compressed oil pipe 84, oil pump 85, compressed oil pipe 86, drain pipe 87, electromagnetic changeover valve 88, valve operation circuit 89, and idle switch 90.

The pressure chamber 81 is defined by an inner space enclosed with the cylinder part 53 and piston part 54. The pressure chamber 81 is provided so that the spring 82 for biasing the piston part 54 toward the lower direction. i.e., toward a side of the second fluid chamber 40, is installed with both ends thereof being fixed on the piston part 54 and cylinder part 53, respectively.

The operating oil pressure passage 83 is formed on the cylinder part 53, the one end being open to the pressure chamber 81 and the other end being close to the operating compressed oil pipe 84 via a connector 91.

The oil pump 85 provides means for producing a pressure applied (compressed) oil to press the piston part 54 downward so as to enlarge the cross sectional area of the ring orifice 60. The compressed oil pipe 86 from the oil pump 85 is connected to the operating compressed oil pipe 84 via the electromagnetic changeover valve 88.

The electromagnetic changeover valve 88 carries out the changeover between the introduction of the pressure applied (compressed) oil from the oil pump 85 to the pressure chamber 81 and drainage of the pressure applied (compressed) oil via the drain valve 87. The switching of the electromagnetic changeover valve 88 is carried out in response to a valve operation signal (a) inputted to a valve solenoid 88a thereof.

The above-described valve operation circuit 89 receives an idling state signal (i) from the idle switch 90 (the idle switch 90 turns on when the engine is idling with an accelerator pedal of the vehicle in a non-depression state and turns off when the accelerator pedal is depressed). When the idling state signal (i) is in the on state, the operation circuit 89 produces a valve operation signal (a) to the electromagnetic changeover valve 88 such that the pressure applied (compressed) oil is introduced from the oil pump 85 to the pressure chamber 81. When the idling state signal (i) is in the off state (i.e., the vehicle is normally running), the operation circuit 89 then produces the valve operation signal (a) such that the pressure applied (compressed) oil is drained via the drain valve The setting of the resonant frequency through the sealed fluid W within the orifice 60 will be described.

Figure 2:
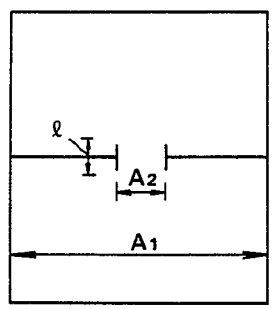
FIG. 2 is a model view for explaining a setting of a resonant, frequency of a fluid-sealed type vibrating object supporting apparatus shown in FIG. 1.

The resonant frequency F of the fluid dynamic damper is generally expressed as follows with reference to FIG. 2:

$$F = \frac{1}{2\pi} \sqrt{\frac{K}{M}} \qquad (1)$$

The fluid equivalent mass M within the orifice is then expressed as follows:

$$M = m \times \left(\frac{A_1}{A_2}\right)^2, \qquad (2)$$

wherein m denotes an actual sealed fluid mass, $A_1$ denotes a cross sectional area of the fluid chamber (in the embodiment, the second fluid chamber), and $A_2$ denotes a cross sectional area of the orifice.

In addition, the sealed fluid mass m is expressed as follows:

$$m = \rho \times A_2 \times l \qquad (3)$$

wherein $\rho$ denotes a relative weight of the sealed fluid and l denotes a length of the orifice.

If the equations (2) and (3) are substituted in the equation (1), the following equation is established.

$$F = \frac{1}{2\pi} \times \sqrt{K} \times \frac{A_2}{\sqrt{\rho \times l \times A_1^2}} \qquad (4)$$

If the length l of the orifice, cross sectional area of the fluid chamber $A_1$, and fluid dynamic constant K are constant, the following equation is established.

$$F = \alpha \times A_2 \qquad (5)$$

wherein $\alpha$ denotes a constant.

Consequently, the resonant frequency F is increased as the cross sectional area $A_2$ of the orifice $A_2$ is increased.

Figure 3:
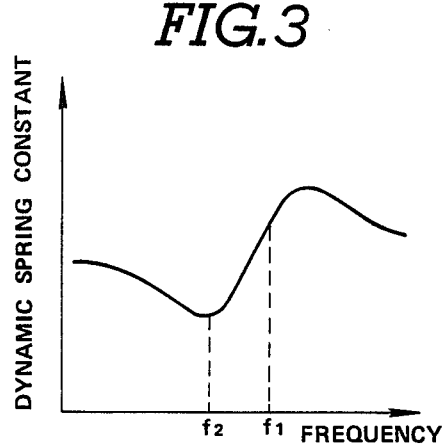
FIG. 3 is a characteristic graph representing a dynamic spring constant of the apparatus shown in FIG. 1 at the time of an engine idling state.

Therefore, in the first preferred embodiment, the pressure applied oil is supplied to the pressure chamber 81 so as to increase the cross sectional area of the orifice across which the sealed fluid flows, thus the apparatus increasing its resonant frequency $f_1$. As shown in FIG. 3, a frequency $f_2$ at which the dynamic spring constant is lowest and which appears in a frequency band slightly lower than the resonant frequency $f_1$ is made equal to slightly higher or lower than about 25 Hz which is a frequency of a second harmonic component of an engine revolutional speed at the time of the idling state of the engine of the vehicle.

Figure 4A:
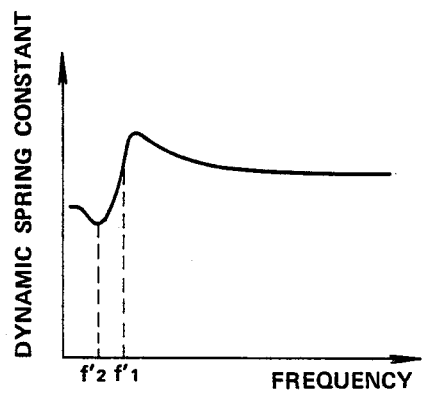
FIGS. 4(A) and 4(B) are characteristics graphs representing the dynamic spring constant and damping force at the time of a running of a vehicle in which the apparatus shown in FIG. 1 is mounted.
Figure 4B:
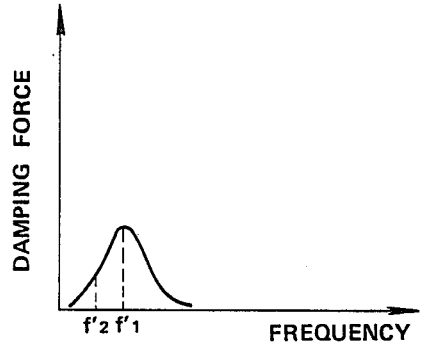

On the other hand, when the engine is not in the idling state but the vehicle runs, the pressure applied oil in the pressure chamber 81 is drained so as to decrease the cross sectional area of the orifice 60, thus the resonant frequency $f_1$, being set at approximately 11 Hz which is a frequency of an engine shake vibration occurring during the vehicle run, as shown in FIG. 4(B).

It should be noted that if a ratio of the cross sectional area of the orifice at the time of the engine idling state to that at the time of the vehicle run except the idling is set about to 6:1, both settings of the above-described frequencies $f_2$ and $f_1$ can be established. That is to say, during the engine idling the piston part 54 is held substantially at a position shown in FIG. 1 and during the vehicle run except the engine idling the piston part 54 is pressed upward to form the ring-shaped orifice 60 with the ring groove 53 of a long orifice length.

Next, an action of the first preferred embodiment will be described.

(A) Idling

When the engine is started and is thereafter in the idling state, the idling state signal (i) is produced from the idle switch 90 so that the electromagnetic changeover valve 88 is changed to introduce the pressure applied oil into the pressure chamber 81. At this time, the piston part 53 is moved downward, as viewed from FIG. 1, so that the cross sectional area of the ring-shaped orifice 60 is increased.

Since the frequency $f_2$ at which the dynamic spring constant is lowest is set so as to coincide substantially with the frequency band (approximately 25 Hz) of the second harmonic component of the engine revolutional speed at the time of the engine idling, the idling vibrations can be reduced by the vibration prevention function of the apparatus provided when the dynamic spring constant is reduced.

It should be noted that the high vibration prevention function can be achieved by increasing the fluidity of the sealed fluid W passing through the ring-shaped orifice 60.

(B) Vehicle running

When the vehicle runs except the engine idling, the inactive idling state signal (i) is produced from the idle switch 90 to change the electromagnetic changeover valve 88 to drain the pressure applied oil via the drain pipe 87. At this time, the piston part 54 is moved upward as viewed from FIG. 1 due to a static pressure in the fluid chamber generated by the support of the power unit 2 so that the cross sectional area of the ring-shaped orifice 60 becomes small.

Since the resonant frequency $f_1$, caused mainly by the sealed fluid W within the ring-shaped orifice 60 when the cross sectional area is small is set so as to coincide substantially with the engine shake vibration frequency (approximately 11 Hz). the engine shake vibrations can be damped due to the vibration damping function of the apparatus derived from the fluid dynamic damper action.

It is noted that when the resonant frequency $f_1$, is set to the low frequency band, the ring groove 53b having the large diameter $l_2$ is used to contribute to the reduction of the resonant frequency in this embodiment.

In this way, since, in the power unit supporting apparatus S of the preferred embodiment, the partitioning member 50 comprises the vertical direction movable assembly member constituted by the cylinder part 53 and piston part 54, the orifice is constituted by the ring-shaped orifice 60, and the actuator 80 is provided for actuating the piston part 54 to move upward and downward along a predetermined stroke of the cylinder part 53, the orifice can be lengthened without increase of the thickness in the partitioning member 50 and a slight stroke displacement by means of the actuator 80 permits a large change in the cross sectional area of the ring-shaped orifice 60.

In the way described above, since the resonant frequency of the vibrating object supporting apparatus is changed as the cross sectional area of the orifice is changed, the vibration prevention function of the apparatus can effectively reduce the idling vibrations mainly through the consequent reduction in the dynamic spring constant and the damping function of the apparatus can effectively reduce the engine shake vibrations mainly through the consequent fluid dynamic damper function. Consequently, the vibrations caused by the power unit 2 can totally be reduced effectively.

Furthermore, a fine tuning of the resonant frequency of the vibrating object supporting apparatus can be facilitated by the setting of the orifice cross sectional area. To reduce the transmission of a vibration input having a different vibration frequency from those in the embodiment, the piston part 54 may merely be displaced to vary the cross sectional area of the orifice 60 according to the vibration frequency to be reduced.

Next, a second preferred embodiment according to the present invention will be described with reference to FIGS. 5 through 7.

In the second preferred embodiment, the cross-sectional area variable orifice is formed of a fixed orifice penetrated through the partitioning member and a butterfly valve 56 disposed at an intermediate position of the fixed orifice 55. The actuator 80 comprises a valve solenoid 92 for actuating the butterfly valve 56. The valve solenoid 92 is fixed to a side surface of the partitioning member 50. The butterfly valve 56 is installed on a rotation rod 93 projected from the valve solenoid 92.

In FIG. 5, a stud bolt 3 is provided through the power unit 2, elastic wall cover 11, partitioning member 50, and ring plate 22 and another stud bolt 4 is provided through the plate 21 and vehicle body 1.

The description of the other constructions will be omitted here since they are the same as those in the first preferred embodiment.

Next, the action of the second preferred embodiment will be described.

Figure 6:
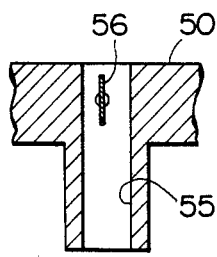
FIG. 6 is a partly cross sectional view of the apparatus shown in FIG. 5 at the time of the engine idling state.

As shown in FIG. 6, the butterfly valve 56 is set vertically with respect to the cross sectional area 55 of the fixed orifice 55 to provide the maximum cross sectional area of the orifice during the engine idling.

Figure 7:
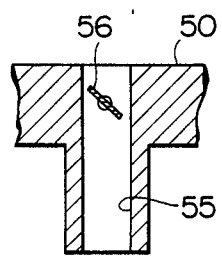
FIG. 7 is a partly cross sectional view of the apparatus shown in FIG. 5 at the time of a running of the vehicle.

On the other hand, as shown in FIG. 7, the butterfly valve 56 is inclined through a given angle with respect to the cross sectional area of the orifice 55 to reduce the cross sectional area.

Since the other action of the second embodiment is the same as that of the first embodiment, the description thereof will be omitted here.

Although both preferred embodiments show the actuator utilizing the pressure applied oil and the actuator utilizing the electromagnetic force, another actuator utilizing an intake vacuum pressure derived from an intake manifold of the engine or compressed air by means of an air compressor may alternatively be used.

In addition, although the actuator for actuating the piston part 54 to displace upward and downward is shown in the first preferred embodiment, the cylinder part 53 may alternatively be actuated or both cylinder part and piston part may alternatively be actuated.

In addition, although in both preferred embodiments the idling and engine shake vibrations are reduced, the power unit supporting apparatus which reduces the other vibrations except those shown in the preferred embodiments or the vibration body supporting apparatus except the power unit of the automotive vehicle may be applied.

Furthermore, although, in the preferred embodiments, the idle switch 90 is used to change the cross sectional area of the orifice, a vehicle speed sensor may alternatively be used to change the cross sectional area of the orifice selectively when the vehicle is stopped and when the vehicle runs or another sensor for detecting a vehicle movement state may alternatively be used.

As described hereinabove, since the vibration body supporting apparatus according to the present invention has an orifice whose cross sectional area is variable to provide a variable resonant frequency, the plurality of vibrations can effectively be reduced with the effective use of its vibration prevention function provided by the reduction of the dynamic spring constant and damping function provided by the fluid dynamic damper action.

It will clearly be understood by those skilled in the art that the foregoing description is made in terms of the preferred embodiments and various changes and modifications may be made without departing from the scope of the present invention which is to be defined by the appended claims.

What is claimed is:

1. An apparatus comprising:
   (a) first means for forming a fluid dynamic damper so as to damp a particular frequency vibration in a vibrating object; and
   (b) second means for changing an orifice cross section in order to alter a fluid equivalent mass of the fluid dynamic damper so as to prevent a transmission of another particular frequency vibration in the vibrating object, wherein
   said first particular frequency vibration damped by said first means is expressed as:

$$F = \tfrac{1}{2}\pi\sqrt{K/M},$$

wherein K denotes the fluid dynamic constant, denotes the fluid equivalent mass, and F denotes said first particular frequency which is varied to a frequency including said second particular frequency.

2. The apparatus according to claim 1, wherein said first means comprises:
   (a) a first fluid chamber having at least one elastic wall thereof;

(b) a second fluid chamber having at least one elastic wall thereof; and (c) a chamber partitioning member disposed between the first fluid chamber and second fluid chamber and including said orifice having a first predetermined cross sectional area within the partitioning member for communicating the first and second fluid chambers, and the fluid dynamic damper is formed of a fluid within the orifice as a fluid mass and of an elasticity caused by an expansion and constriction of the first and second fluid chambers due to a fluidity of a sealed fluid in the first and second fluid chambers.

3. The apparatus according to claim 2, wherein said second means is formed when the cross sectional area of the orifice of the chamber partitioning member is changed from the first predetermined cross sectional area to a second predetermined cross sectional area.

4. The apparatus according to claim 3, wherein the cross sectional area of the orifice is selectively variable between the first and second predetermined cross sectional areas.

5. The apparatus according to claim 3, wherein the cross sectional area of the orifice is continuously variable.

6. The apparatus according to claim 3, wherein the first predetermined cross sectional area of the orifice is smaller than the second predetermined cross sectional area.

7. The apparatus according to claim 3, wherein said partitioning member comprises: (a) a cylinder part having a first communication passage opened to the first fluid chamber and a second communication passage opened to the second fluid chamber and a piston part disposed between the first and second communication passages and wherein the orifice of the partitioning member has a substantially semicircumferential ring shape formed between an inner wall of the cylinder part and an end surface of the piston part.

8. The apparatus according to claim 7, wherein the partitioning member further comprises a ring groove having a larger diameter than that of the substantially semicircular ring shaped orifice part at an inner wall of the piston part so that an elongated ring-shaped orifice is formed with the ring groove and end surface of the piston part when the end surface of the piston part is contacted with another end surface of the cylinder part.

9. The apparatus according to claim 8, wherein a incompressible fluid is sealed in the first fluid chamber, second fluid chamber, first and second communication passages, and ring orifice.

10. The apparatus according to claim 3, which further comprises third means for actuating the partitioning member to change the cross sectional area of the orifice so that a resonant frequency of the apparatus is varied.

11. The apparatus according to claim 10, wherein the vibrating body is a power unit of an automotive vehicle and wherein said third means actuates the partitioning member to change the cross sectional area of the orifice between the first and second predetermined cross sectional area depending on whether the power unit of the vehicle is in an idling state or in a state where the vehicle is running.

12. The apparatus according to claim 10, wherein the vibrating body is a power unit of an automotive vehicle and wherein said third means actuates the partitioning member to change the cross sectional area of the orifice defending on whether the vehicle is running or not.

13. The apparatus according to claim 8, wherein the vibrating body is a power unit of an automotive vehicle and which further comprises an actuator for actuating the piston part to displace along the cylinder part to change the cross sectional area of the ring-shaped orifice depending on whether the power unit is in an idling state or in a state where the vehicle is running.

14. The apparatus according to claim 13, wherein said actuator comprises: (a) a pressure chamber defined by an inner space enclosed with the cylinder part and piston part; (b) a spring installed within the pressure chamber for biasing the piston part toward the second fluid chamber side; (c) an oil pump for producing a pressure applied oil to press the piston part toward the second fluid chamber so as to increase the cross sectional area of the ring-shaped orifice; (d) an electromagnetic changeover valve for switching between the introduction of the pressure applied oil from the oil pump to the pressure chamber and the drainage of the pressure applied oil from the oil pump; and (e) an electromagnetic changeover valve operation circuit for producing an electrical signal to the electromagnetic changeover valve to select switching between the introduction of the pressure applied oil from the oil pump to the pressure chamber and the drainage of the pressure applied oil depending on whether the power unit is in the idling state or in a state where the vehicle is running.

15. The apparats according to claim 14, wherein the actuator displaces the piston part toward the second fluid chamber side through the introduction of the pressure applied oil into the pressure chamber so that the cross sectional area of the ring-shaped orifice is increased to reach the second predetermined cross sectional area when the power unit is in the idling state and at this time a frequency at which the dynamic spring constant is lowest becomes coincident approximately with a frequency band of a second harmonic component of an engine revolutional speed of the power unit.

16. The apparatus according to claim 14, wherein the actuator displaces the piston part toward the first fluid chamber against the biasing force of the spring through the drainage of the pressure applied oil from the pressure chamber so that the cross sectional area of the ring-shaped orifice is decreased to reach the first predetermined cross sectional area when the vehicle runs and at this time a resonant frequency caused by a fluid in the ring-shaped orifice becomes coincident approximately with an engine shake vibration frequency.

17. The apparatus according to claim 3, wherein the vibration body is a power unit of an automotive vehicle and said partitioning member comprises the orifice penetrated therethrough for communicating the first and second fluid chambers and a butterfly valve installed within the orifice and which further comprises an actuator for actuating the butterfly valve to change the cross sectional area of the orifice depending on whether the power unit is in an idling state or in a state where the vehicle is running.

18. An apparatus comprising:
(a) first means for supporting a vibrating object, said first means having a resonant frequency;
(b) second means for detecting an operation condition of the vibrating object; and
(c) third means for varying the resonant frequency of said first means according to the detected operating condition so that the transmission of a plurality of vibrations in the vibrating object can be suppressed, wherein said first means comprises:
(i) a first fluid chamber having at least one elastic wall part thereof;
(ii) a second fluid chamber having at least one elastic wall part thereof;
(iii) a partitioning member disposed between the first and second fluid chambers; and
(iv) an orifice penetrated through the partitioning member for communicating the first and second fluid chambers so that said first means forms the vibrations object supporting apparatus made of a fluid dynamic damper comprising part of fluid in the orifice as a fluid mass and an elasticity caused by a flow of the sealed fluid between the first and second fluid chambers as a fluid spring and wherein said third means varies a cross sectional area of the orifice to vary the resonant frequency of the first means according to the detected operating condition.

19. The apparatus according to claim 18, wherein said third means varies the cross sectional area of the orifice using a hydraulic force.

20. The apparatus according to claim 18, wherein said third means comprises a butterfly valve installed within the orifice and fourth means for actuating the butterfly valve to rotate to change the cross sectional area of the orifice according to the detected operating condition of the vibrating object.

21. The apparatus according to claim 18, wherein the vibrating object is a power unit of an automotive vehicle, said second means detects whether the power unit is in an idling state or in a state where the vehicle is running, and said third means increases the cross sectional area of the orifice so that the resonant frequency coincides substantially with a frequency band of a second harmonic component of an engine revolutional speed when the power unit is in the idling state and decreases the cross sectional area of the orifice so that the resonant frequency coincides substantially with an engine shake vibration frequency when the vehicle is in the running state.

22. An apparatus for supporting a power unit mounted in a vehicle, comprising:
(a) first means for forming a fluid dynamic damper so as to damp a first particular frequency vibration of the power unit;
(b) second means, installed in the first means, for varying an orifice cross section in order to alter a fluid equivalent mass of the fluid dynamic damper so as to prevent a transmission of a second frequency, vibration of the power unit, wherein
said first particular frequency vibration damped by said first means is expressed as:

$$F = \tfrac{1}{2}\pi \sqrt{K/M},$$

wherein K denotes the fluid dynamic constant M denotes said fluid equivalent mass, and F denotes said first particular frequency which is varied to a frequency including said second particular frequency.

* * * * *